B. JACOBS.
Attachment for Gas Fixtures.

No. 54,915.

Patented May 22, 1866.

Witnesses.

Inventor

UNITED STATES PATENT OFFICE.

BERNARD JACOBS, OF NEW YORK, N. Y.

IMPROVED ATTACHMENT TO GAS-FIXTURES.

Specification forming part of Letters Patent No. 54,915, dated May 22, 1866.

*To all whom it may concern:*

Be it known that I, BERNARD JACOBS, of the city, county, and State of New York, have invented a new and Improved Safety Attachment to Gas-Fixtures; and I do hereby declare that the following is a full, clear, and exact description thereof, which will enable others skilled in the art to make and use the same, reference being had to the accompanying drawings, forming part of this specification, in which—

Figure 1:
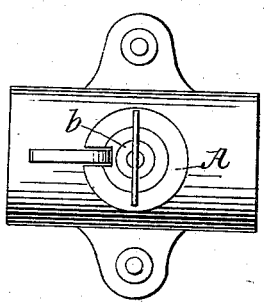
Figure 2:
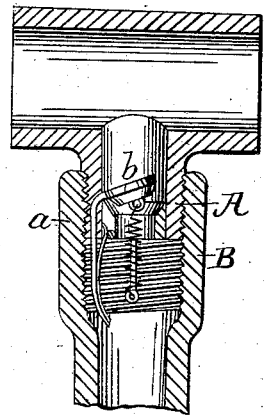

Figure 1 is an end view of this invention. Fig. 2 represents a longitudinal central section of this invention.

Similar letters of reference indicate like parts.

This invention relates to the arrangement of a spring-valve in the interior of a gas-pipe, where the same joins a chandelier or pipe running down to a burner, or at any other convenient spot between the supply-pipe and burner or burners, in such a manner that when said chandelier or other pipe should accidentally become detached from the gas-supply pipe the spring-valve will close automatically and the escape of gas is prevented.

A represents a nipple or portion of the gas-supply pipe in the ceiling of a room or other part of a building, to which the pipe B is attached by a screw-thread, $a$, in the usual manner. In the joint I have arranged a spring-valve, $b$, which is so situated that it is held open as long as the pipe B is connected to the pipe A; but as soon as the pipe B becomes detached by accident or design the spring-valve closes and the escape of gas is prevented. By this simple safeguard the occupants of a room are saved from the danger of being suffocated if in the night-time one of the gas fixtures or pipes leading to the burners should accidentally become detached; and, furthermore, in attaching and detaching the escape of gas into the room is prevented without trouble or loss of time.

My safety attachment is applicable to gas-pipes of any description, indoors and outdoors, though it is particularly intended for gas-fixtures such as above described, and in some cases the spring-valve $b$ might be replaced by a simple valve which closes by its own gravity, or by a plug-valve or a valve of any other suitable description.

What I claim as new, and desire to secure by Letters Patent, is—

The spring-valve $b$ or its equivalent, in combination with the pipes A and B, or in the joint between two pipes bearing a similar relation to each other as said pipes, substantially as and for the purpose set forth.

B. JACOBS.

Witnesses:
M. M. LIVINGSTON,
W. HAUFF.